US012638316B2

(12) United States Patent
Brajon et al.

(10) Patent No.: US 12,638,316 B2
(45) Date of Patent: May 26, 2026

(54) POSITION SENSOR WITH MASTER AND NONIUS TRACKS

(71) Applicant: Melexis Technologies SA, Bevaix (CH)

(72) Inventors: Bruno Brajon, Bevaix (CH); Christian Schott, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 80 days.

(21) Appl. No.: 18/322,809

(22) Filed: May 24, 2023

(65) Prior Publication Data

US 2023/0296416 A1 Sep. 21, 2023

Related U.S. Application Data

(63) Continuation-in-part of application No. 18/058,439, filed on Nov. 23, 2022, now Pat. No. 12,270,687.

(30) Foreign Application Priority Data

Nov. 25, 2021 (EP) ..................................... 21210602

(51) Int. Cl.
*G01D 18/00* (2006.01)
(52) U.S. Cl.
CPC ................................. *G01D 18/001* (2021.05)
(58) Field of Classification Search
CPC ............................ G01R 33/00; G01R 33/0035; G01R 33/0023; G01R 33/0017; G01R 31/3191; G01R 33/0358; G01R 33/0356; G01B 7/004; G01B 7/30; G01C 17/38; G06F 3/017; G06F 3/0346; G06F 3/012; H01L 39/223; G01D 5/145; G01D 18/001
See application file for complete search history.

(56) References Cited

U.S. PATENT DOCUMENTS

| | | | | | |
|---|---|---|---|---|---|
| 6,108,167 | A | * | 8/2000 | Tateyama | G11B 5/3146 |
| | | | | | 360/125.51 |
| 10,859,402 | B2 | | 12/2020 | Duret | |
| 2016/0146630 | A1 | * | 5/2016 | Takahashi | G01D 5/14 |
| | | | | | 324/207.25 |

(Continued)

FOREIGN PATENT DOCUMENTS

EP 3650816 A1 5/2020

OTHER PUBLICATIONS

Extended European Search Report for Corresponding EP Application 21210602.5, May 19, 2022.

*Primary Examiner* — Lee E Rodak
*Assistant Examiner* — Taqi R Nasir
(74) *Attorney, Agent, or Firm* — Workman Nydegger

(57) ABSTRACT

A sensing system and a method for sensing position include a first magnetic track comprising a first number of multi-poles for generating a magnetic field solidarily fixed to a second magnetic track for generating a magnetic field and a second sensor for sensing magnetic field, forming a magnetic structure. At least two sensors are included. The first sensor is positioned proximal to the first magnetic track, closer to the first magnetic track than to the second magnetic track. The second sensor is positioned between the first sensor and the second magnetic track. The distance between the first sensor and the second magnetic track is larger than the distance between the second sensor and the second magnetic track. The magnetic flux density generated by the first and second magnetic tracks follow a ratio of two or more.

17 Claims, 7 Drawing Sheets

(56)  References Cited

U.S. PATENT DOCUMENTS

| | | | | |
|---|---|---|---|---|
| 2017/0343380 | A1* | 11/2017 | Liu | ...................... G01D 5/2452 |
| 2020/0041308 | A1* | 2/2020 | Kuwahara | ................ G01D 5/14 |
| 2020/0232823 | A1 | 7/2020 | Weiland et al. | |
| 2021/0025736 | A1* | 1/2021 | Khripin | ................ G01D 5/2452 |
| 2021/0148734 | A1 | 5/2021 | Foletto | |
| 2021/0331313 | A1 | 10/2021 | Klingensmith | |

* cited by examiner

Bx1,By1 and Bz1

$Bz1 \sim H1+H2+H3+H4$ $Bx1 \sim H1-H3$ $By1 \sim H2-H4$

Bx2,By2 and Bz2

| $Bz1 \sim HH1$ | $dBx/dx \sim Bx1-Bx2$ | $Bz2 \sim HH2$ |
| --- | --- | --- |
| $Bx1 \sim VH1$ | $dBy/dx \sim By1-By2$ | $Bx2 \sim VH3$ |
| $By1 \sim VH2$ | $dBz/dx \sim Bz1-Bz2$ | $By2 \sim VH4$ |

$Bz1 \sim HP1+HP2$
$By1 \sim HP1-HP2$

Bz1 ~ HH1
By1 ~ VH1

POSITION SENSOR WITH MASTER AND NONIUS TRACKS

FIELD OF THE INVENTION

The invention relates to the field of position sensing. More specifically it relates to a position sensing system for determining the relative position of a magnetic structure relative to a magnetic field sensor.

BACKGROUND OF THE INVENTION

Position sensing systems are usually included in devices where it is necessary to detect the position of some of their components. For example, many engines include angular position sensing systems to detect the relative position of the rotor relative to the stator, in order to ensure proper powering of the engine coils.

They usually include a magnetic field sensor and a magnetic piece. The relative motion of one respect the other is detected by the sensor, which provides a signal. Accuracy, resolution, and other characteristics of the measurement signal depend on several factors, such as the type of the magnet. Conventional rotary encoders with a simple dipole magnet and a Hall magnetic sensor are limited in angular resolution to about 0.02 degrees and in angular accuracy over temperature to about 0.3 degrees, which also depend on signal-to-noise ratio.

Multipolar magnets improve resolution and accuracy of the relative positioning. However, the multipolar magnet is divided in sectors, and it is not possible to identify the position of the angle sector itself with just a magnetic sensor. This means that the information relative to absolute angular position is lost.

To solve this, existing magnetic structures include two multipole magnetic tracks where one of them has one pole pair less than the other, so the full 360° range can be reconstructed by combining the signals of both tracks obtained by a pair of sensors, which are usually integrated in a single chip. The track with the highest number of poles is the 'master track'.

The difference between the signals from the two tracks is used to discriminate the sector, while the signal of the master track is used to measure the angle. However, these types of systems have high crosstalk between the fields. It is possible to physically separate the tracks to reduce crosstalk, but two separate chips are required, or alternatively the integrated sensors require more separation and thus larger sensor chip area thus increasing cost.

SUMMARY OF THE INVENTION

It is an object of embodiments of the present invention to provide a sensing system and position sensor including such system, as well as a method for sensing position. The present invention allows accurate detection of the position of a magnetic structure with respect to magnetic sensors without losing information regarding absolute position. It also allows providing a compact sensing system where the sensors may be integrated.

In a first aspect the present invention provides a sensing system for sensing position, including a first magnetic track comprising a first number of multipoles for generating a magnetic field and a second magnetic track for generating a magnetic field. The first and second magnetic tracks are solidarily fixed to each other, forming a magnetic structure.

At least a first sensor and a second sensor are included for sensing magnetic field in different positions.

The first sensor is positioned proximal to the first magnetic track, closer to the first magnetic track than to the second magnetic track. The second sensor is positioned between the first sensor and the second magnetic track. The distance between the first sensor and the second magnetic track is larger than the distance between the second sensor and the second magnetic track. The magnetic flux density generated by the first and second magnetic tracks follow a ratio of two or more.

It is an advantage of embodiments of the present invention that the signals sensed by the first sensor are be affected by a negligible contribution of the crosstalk from the weaker second track, so crosstalk compensation is not required, while providing a compact device and highly integrable sensors.

In some embodiments of the present invention, a projection of the first sensor in the direction perpendicular to the track (in the direction of the distance between the sensor and the magnetic structure) overlaps the first track. In some embodiments, a projection of the second sensor in the direction of the distance between the second sensor and the magnetic structure does not overlap the first track. For example, the projection of the second sensor overlaps a gap of non-magnetic material provided between the first track and the second track. For example, the projection of the second sensor overlaps the second track. The present invention is not limited thereto, and the second sensor may be positioned so its projection overlaps also the first track.

In some embodiments of the present invention, the tracks are concentric tracks rotatable about a common rotation axis.

It is an advantage of embodiments of the present invention that an angular position sensing system can be provided.

In particular embodiments, the tracks are coplanar tracks. The second track is enclosed by the first track. The first track has a first predetermined width, and the second track has a second predetermined width. The first predetermined width is at least two times larger than the second predetermined width.

It is an advantage of embodiments of the present invention that a sensing system with a flat profile can be provided.

In some embodiments of the present invention, the first and second tracks are stacked rings with the same outer radius. The width defined in the axial direction of the first track is at least twice as large than the width of the second track.

It is an advantage of embodiments of the present invention that the ring multipoles are easy to provide. It is a further advantage that the sensor can be located on a side, which may be desirable under some spatial constraints.

In some embodiments of the present invention, the first track is a multipole with at least 8 dipoles, where the second track comprises a non-zero number of dipoles, the number being different than the number of dipoles of the first track.

It is an advantage of embodiments of the present invention that the sensing system can be made more compact compared to other solutions with more multipoles.

In some embodiments of the present invention, the first and second sensors are adapted for sensing different field components, typically tangential and axial field components.

It is an advantage of embodiments of the present invention that the position relative to the second track can be obtained by linear combination of the axial field and tangential field components; the axial component being usually less sensitive to crosstalk.

In some embodiments of the present invention, the first and second sensors are integrated in a single semiconductor chip.

It is an advantage of embodiments of the present invention that the manufacture costs can be reduced without sacrificing compactness or accuracy.

In some embodiments of the present invention, the system further includes a signal processing means for processing the signals of the sensors. The system further includes a signal output, for providing the absolute position of the first track relative to the sensor.

It is an advantage of embodiments of the present invention that the sensing system can be used as a position sensor.

In particular embodiments, the processing means is adapted to calculate the initial position from the measurement of the second sensor at startup of the sensing system.

It is an advantage of embodiments of the present invention that the sensing system can provide sector discrimination during power on, so it can be simply adapted by taking into account the measurement of the first sensor. It is a further advantage that the computational load can be relieved, thus increasing sensing speed.

In particular embodiments, the processing means is adapted to obtain the position with the measurement signals from the first and second sensors, and to calibrate the position.

It is an advantage of embodiments of the present invention that a simple look-up table can be used to compensate for e.g., mechanical misalignments, imperfections in the track, etc.

In a second aspect, the present invention provides a method of sensing a position using the sensing system of any one of the previous claims further comprising retrieving the measurement of the first and second sensors, and calculating the position of the magnetic structure relative to the first sensor.

It is an advantage of embodiments of the present invention that the position can be obtained without need of crosstalk compensation.

In some embodiments of the present invention the method further comprises subsequently calibrating the result for compensation of mechanical misalignments.

It is an advantage of embodiments of the present invention that a simple look up table can be used.

In some embodiments of the present invention the method further comprises detecting the position of the first track by using the measurement of the first sensor and second sensor for detecting the dipole of the magnetic structure over which the sensors are, while ignoring the measurement of the second sensor for detecting the absolute position of the first sensor with respect to the magnetic structure.

It is an advantage of embodiments of the present invention that the initial measurement can be updated with the measurement of the absolute position.

In some embodiments of the present invention, detecting the position of the dipole and the absolute position is performed at startup of the sensor, for example as a first step, wherein the method further comprises ignoring the signals of the second sensor in subsequent measurements, after the initial position of the first track is detected, by using the measurement of the first sensor for retrieving the dipole of the magnetic structure over which the sensors are. It is an advantage that method can provide faster measurement.

In some embodiments of the present invention, detecting the position of the first track is performed by using the measurement of the first sensor and second sensor for detecting the dipole of the magnetic structure over which the sensors are, and for detecting the absolute position of the first sensor with respect to the magnetic structure, by performing linear combination of the measurements of the first and second sensor.

In some embodiments of the present invention, calculating the position of the magnetic structure relative to the first sensor comprises retrieving a linear combination of both axial and tangential components of the magnetic field generated by both tracks.

It is a further advantage that method can provide the position of the second track without complex calculations, allowing the reconstruction of the absolute position of the system, for example the angular position within a cycle of 360°.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
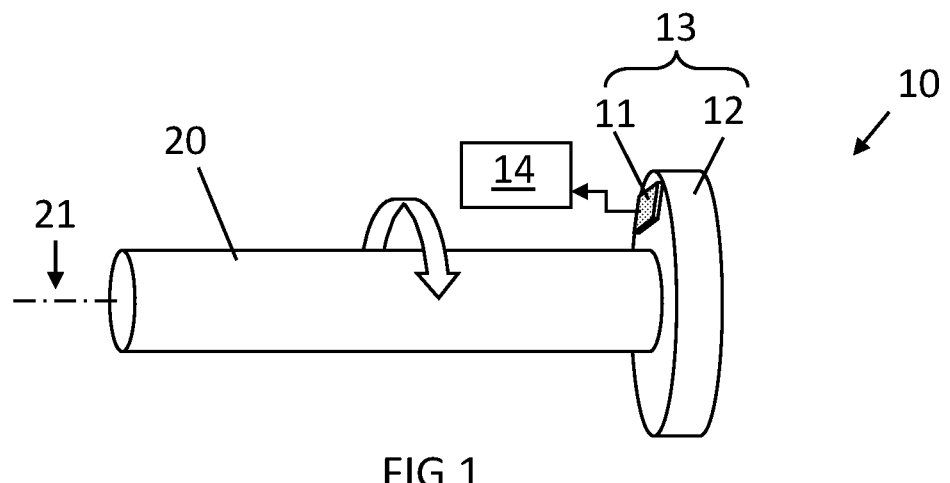
FIG. 1 illustrates a prior art sensor and rotatable axle as target to be measured.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "position sensing system", reference is made to a system including components such as a magnetic structure and a sensor device including sensors for detecting a parameter or a set of parameters linked to the position of a moving target, which imparts relative movement between the structure and the sensors. These sensors may include sensing elements which provide signals (e.g., electric signals) proportional to the detected parameter or parameters. The parameters may be, for example, components of a magnetic field. Thus, the position sensing system provides signals that can be processed to obtain the position of the target. These signals can be processed by a processor, for example a microelectronic processor, monolithically integrated microprocessor, etc. In the frame of the present invention, a position sensor can be defined as a position sensing system combined with a processor for processing the signals of the system.

The present invention relates to a position sensing system for measuring the position of a target. A prior art position sensor 10 is shown in FIG. 1, including a magnetic field sensor or sensors integrated in the chip 11, and a magnetic structure 12 forming a sensing system 13, where one of the sensors or the structure moves together with the target while the other remains fixed. In the exemplary sensor 10 of FIG. 1, the target is an axle 20 which rotates around its axis 21, and the magnetic structure 12 (such as a disc) is attached to the axle 20 rotating with it, while the chip 11 is static. For example, it may be attached to a housing (not shown). The relative position of the sensor and the structure can be measured, by measuring the magnetic field generated by the magnetic structure 12, and changes of said field at the position of the sensor chip 11. The sensor can measure the polarization of the field (north or south) as well as the flux, which indicates how close is the position to the center of the particular pole or how close is to the border with the other pole. The sensor may include several sensing elements for measuring different magnetic components of the vector field, thus improving the positioning. Signals from the sensor chip 11 can be processed by the processor 14, which can calculate the position of the magnet based on the field sensed at the position of the sensor chip 11.

The disclosure can be applied to a moving magnetic structure relative to a fixed sensor or to a static magnetic structure and a sensor which moves relative to the magnetic structure.

In case of, for example, sensing systems for sensing angular position, conventional rotary encoders with a simple dipole magnet and a magnetic sensing element can provide the absolute angular position, since both the orientation and value of the field are measured by the magnetic sensing element, and these the same parameter configuration repeats each complete turn. Thus, a measurement will give the exact angle within one turn (360°).

However, the resolution in state-of-the-art position sensors is limited to 0.02°, or 14 bits, and the angular accuracy over temperature is about 0.3 degrees, including temperature drift, signal-to-noise ratio, positioning errors, etc. This limitation is given by the relative mechanical positioning of the magnet and the magnetic sensor, as well as by the signal to noise ratio. The use of a multipolar magnet, including multiple dipoles (e.g., multiple dipoles with a north and south pole each) is an available solution to increase resolution and angular accuracy. The following text will refer to multipolar magnets as simply 'multipoles'. In a multipole, each dipole covers a portion of the structure (for example, a subdivision of the full rotation of 360°), making the field more variable with the motion, thus increasing the accuracy of the magnetic sensor. In such a way the resolution of accuracy can be directly improved by the number of applied pole pairs if the field strength of both signals is maintained. For 8 pole pairs the accuracy can therefore be improved by a factor of 8.

On the other hand, by using a multipole approach, the direct information on the absolute position is lost, since the pole pairs repeat every subdivision. Although the angle is measured accurately in that subdivision or angle sector (e.g., 45° sector for 8 pole pairs), from the multipole alone, it is not possible to identify the angle sector.

To remedy this problem, existing systems use a compound magnetic structure formed by two magnetic tracks. The term "track" as part of a magnetic source, as used herein, typically refers to a ring-shaped or annular shaped or cylindrical shaped object when talking about an angular position sensor system and typically refers to a beam-shaped object when talking about a linear position sensor system.

The magnetic structure includes a first track or master track and a second track, also called a nonius track. The master track is a multipole with a predetermined number of dipoles, and the nonius track is a multipole which has a different number of pole pairs than the master track, usually less pole pairs (accuracy is not as critical as for the master track so design can be simplified). The field generated by each track is sensed by a respective magnetic sensor. By combining the measured signals, it is possible to retrieve the angular position within one 360° turn. The number of pole pairs of each track and difference thereof can be adapted so as to optimize the calculation of the angular position. For example, considering that the master track has n pole pairs, the nonius track usually has with n−1 pole pairs, however more than one dipole in common designs and also in some embodiments of the present invention. It is noted that the nonius and master tracks include the same type of magnetic material with substantially the same size, so the flux is substantially the same. The difference in the intensity of the field or on the flux sensed by the first and second sensors are due to the different relative position of the poles along the magnetic structure, as the number of poles of the master and nonius track is different. Thus, in the prior art, the flux of the poles in the master and nonius tracks are substantially the same.

Figure 2:
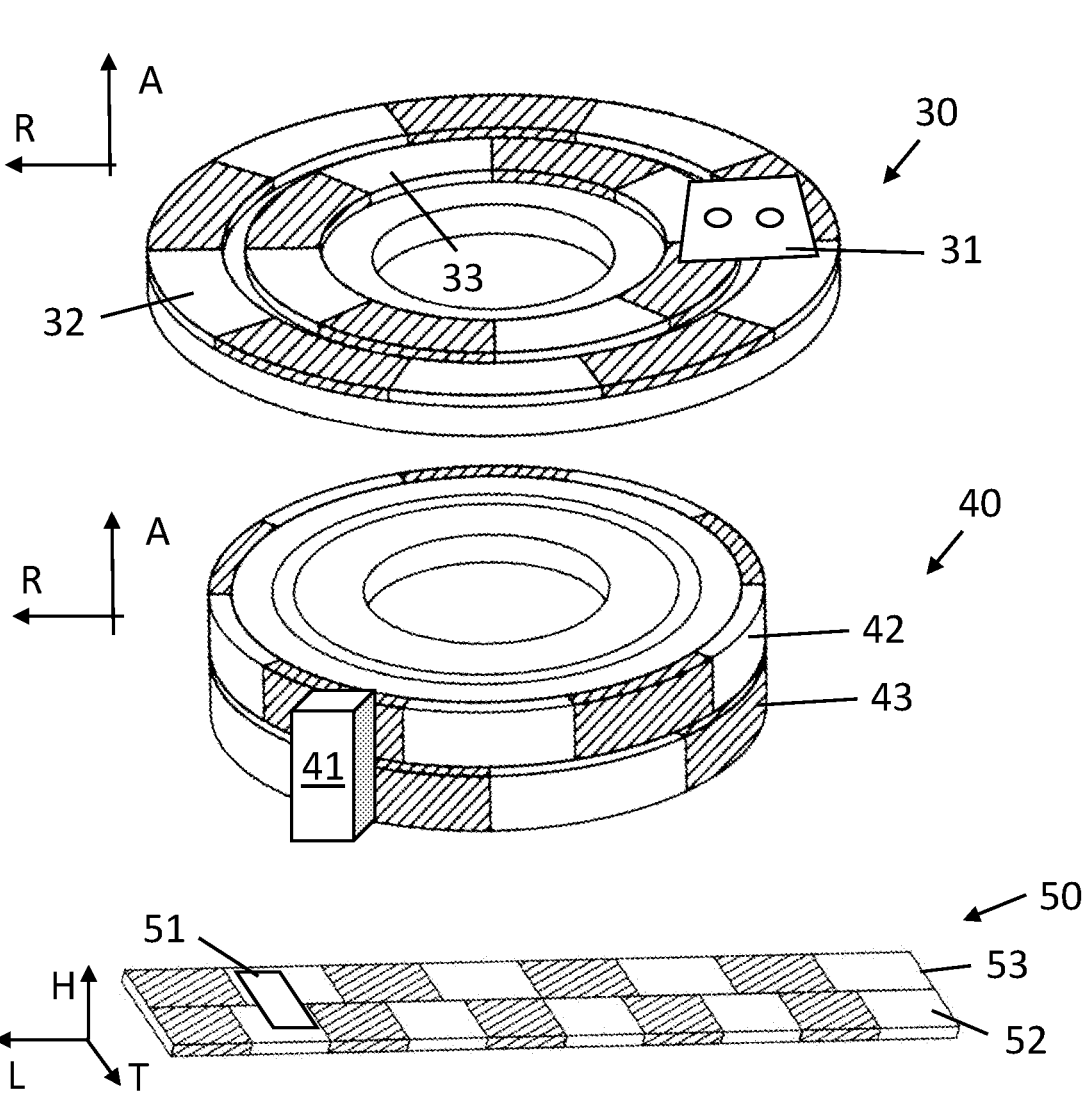
FIG. 2 illustrates three magnetic structures or encoders with multipoles, the first two being angular encoders, and the third being linear.

Examples of these tracks are shown in FIG. 2. The top magnetic source 30 is a structure comprising two concentric tracks located in a single plane, for an angular position sensor. The magnetic sensor device 31 may be arranged above or below that plane. In the example, the first track 32 is formed by an outer ring having five pole pairs and the second track 33 is formed by an inner ring having four pole pairs. These rings are preferably axially magnetized. When there is a relative rotational movement between the sensors and the source 30, the sensor device 31 senses, for each rotation, eight poles with the inner track sensor, and ten poles with the outer track sensor.

The figure in the middle shows a magnetic structure 40 comprising two cylindrical tracks 42, 43 having a same radius, and a sensor device 41 arranged as a satellite, movable around these cylindrical tracks (or the cylinder rotates around its center perpendicularly to the axial direction A while the sensor device 41 remains fixed).

The lowest figure shows a magnetic structure 50 for a linear position sensor comprising a magnetic sensor device 51 and two parallel, linear tracks 52, 53 located in a single plane, the sensor device 51 being arranged above or below that plane. The first track 52 may be formed by a first multi-pole magnet having five pole pairs and the second track 53 is formed by a second multi-pole magnet having four pole pairs. These magnets are preferably magnetized in the height direction H. The sensing system as before would sense five N poles and five S poles for the first track, and four N poles and four S poles for the second track, when there is a relative motion between the magnetic sensing system and the magnetic structure along said structure over the longitudinal direction L.

As mentioned, the magnetic sensor device includes a first and second sensor for the respective track and these provide measurement of the magnetic field in at least two distinct directions. For example, each sensor is adapted to provide measurement of the magnetic field in at least two distinct directions. For example, each sensor device comprises at least two magnetic sensing elements, the elements of the first sensor being configured for measuring at least two first orthogonal magnetic field components (typically referred to as By1, Bz1) at a first sensor location (P1) over the first magnetic track, and the elements of the second sensor being configured for measuring at least two second orthogonal magnetic field components (typically referred to as By2, Bz2) at a second sensor location (P2).

In the following, several magnetic sensor devices are explained with reference to FIG. 3 to FIG. 10. It is noted that the Z direction follows the direction from the sensor to the magnetic structure. This corresponds to the axial direction in coplanar angular magnetic structures and to the radial direction in case of stacked cylindrical magnetic structures.

Figure 3:
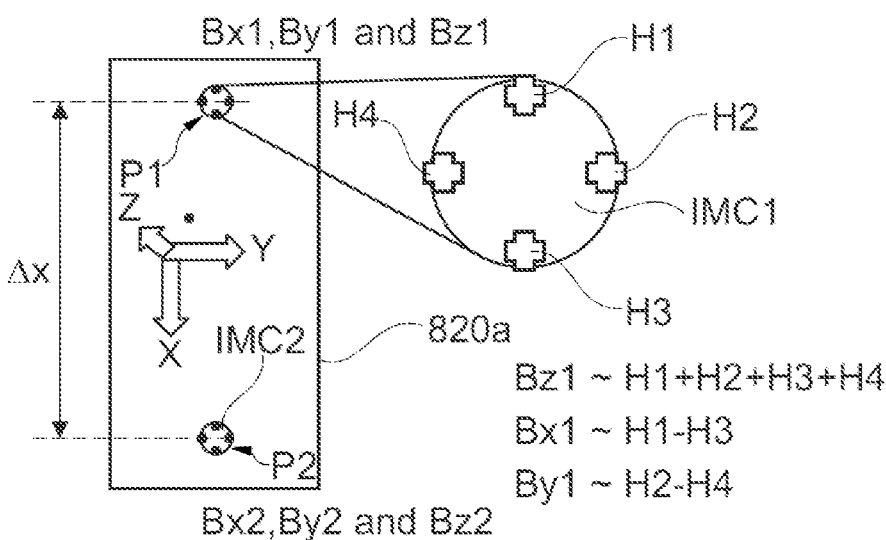
FIG. 3 to FIG. 10 illustrate different sensor devices including a plurality of magnetic sensors with different distributions and suitable to measure orthogonal components of the magnetic field.

FIG. 3 shows a schematic representation of a sensor device 820a with a first and second magnetic sensors at locations P1, P2 spaced apart over a predefined distance Δx along the X-axis. Each sensor comprises four horizontal magnetic sensing elements, such as Hall elements H1-H4 arranged near the periphery of an integrated magnetic flux concentrator IMC1, IMC2. Three orthogonal magnetic field components, Bx, By, Bz can be measured at each location P1, P2 as described in more detail in publication EP3650816A1. The components are obtained from differences or additions of the signals from different elements (such as Bx1 being proportional to the difference of signals of H1-H3). Thus, the sensor device 820a has eight magnetic sensing elements capable of measuring two sets of three orthogonal magnetic field components, namely (Bx1, By1, Bz1) at a first sensor position P1, and (Bx2, By2, Bz2) at a second sensor position P2.

Figure 4:
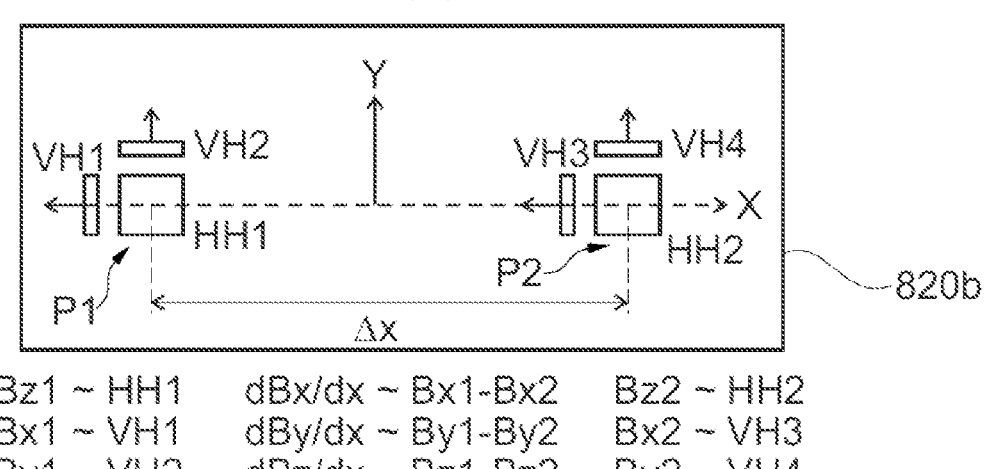

FIG. 4 shows another sensor device comprising two magnetic sensors each spaced apart over a predefined distance Δx, each sensor including a structure comprising one horizontal Hall sensing element (for measuring Bz) and two vertical Hall sensing elements, one for measuring Bx, and one for measuring By. The magnetic sensor device 820b is thus also capable of measuring three orthogonal magnetic field components, namely (Bx1, By1, Bz1) at the first sensor position P1, and (Bx2, By2, Bz2) at the second sensor position P2.

Figure 5:
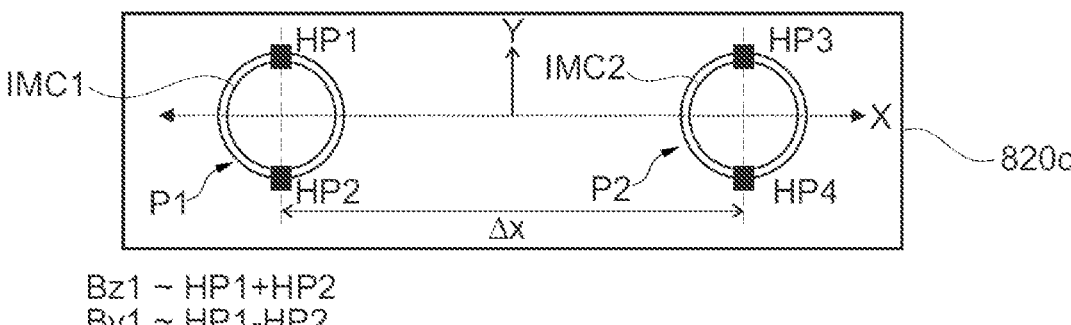

The sensor device in FIG. 5 also includes two sensors spaced apart over a predefined distance Δx, each including a structure comprising only two horizontal Hall elements arranged on opposite sides of an IMC disk and located on a virtual line perpendicular to the X-axis. Each sensor structure is capable of measuring two orthogonal components By, Bz at each of the sensor locations P1, P2. This sensor device advantageously requires only four horizontal Hall elements instead of eight.

Figures 6, 7, 8, 9, 10:
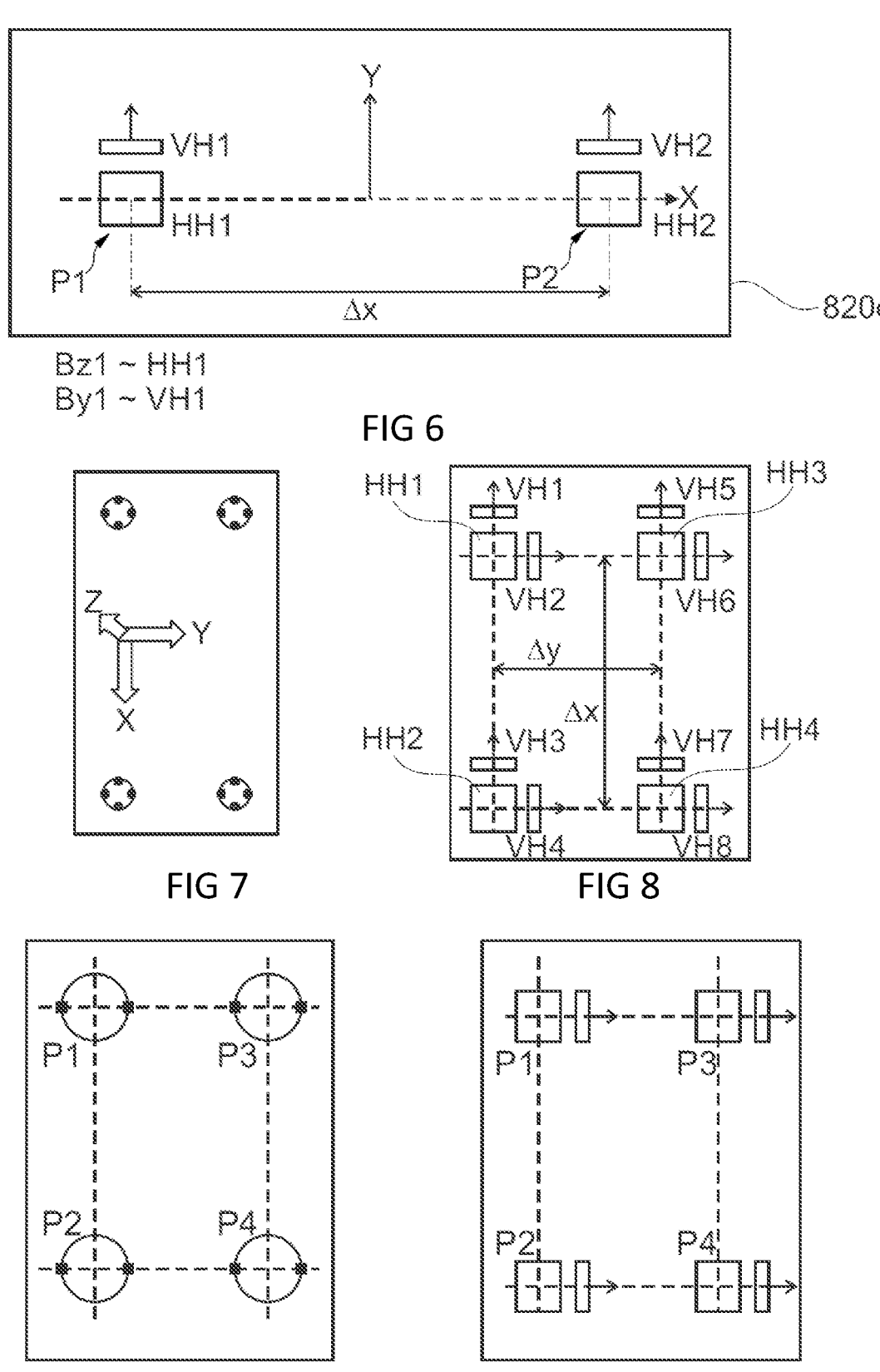

FIG. 6 shows another sensor device comprising two magnetic sensors structures spaced apart over a predefined distance Δx, each sensor structure comprising one horizontal Hall element and one vertical Hall element. Each sensor structure is capable of measuring two orthogonal components By, Bz. It does not require integrated magnetic flux concentrators; hence it may be easier to produce.

Since the absolute position can be retrieved using two orthogonal components, these types of sensors which provide two orthogonal components are enough.

FIG. 7 shows a variant of FIG. 3, and FIG. 8 shows a variant of FIG. 4. The sensor devices of FIG. 7 and of FIG. 8 each comprise four sensors spaced apart in the X and in the Y-direction, instead of only two sensors. These devices are capable not only of measuring three orthogonal components (Bx1, By1, Bz1) at P1, and another three (Bx2, By2, Bz2) at P2, but are also capable of determining spatial gradients of Bx, By and Bz at the two sensor locations P1, P2 as dBx/dy, dBy/dy, dBz/dy.

Although the setup is more complex, gradient signals are useful as they are highly insensitive to an external disturbance field, and thus also the overall angular position will be highly insensitive to an external disturbance field.

The gradient signals dBy/dy and dBz/dy can then be transformed into two sets of quadrature signals e.g., using a set of linear or polynomial equations with a relatively small number of coefficients, e.g., predefined coefficients, which may be determined by simulation, or by measurement, e.g., after assembly. The coefficients may be stored in nonvolatile memory, for example in a processing unit, such as a microelectronic processor or the like. A first angle α1 relative to the inner ring, and a second angle α2 relative to the second ring can then be calculated based on an arctangent function of the quadrature signals.

It is noted that obtaining gradient signals is optional; for example, in FIG. 3 to FIG. 6 the two components (e.g., By and Bz) may be in quadrature, and gradient signals are not required.

FIG. 9 is a simplification of the sensor device of FIG. 7 where the components in X direction and gradient dBx/dy are not obtained for each sensor. It is similar to the sensor device of FIG. 5 further capable of measuring magnetic field gradient signals dBy/dy and dBz/dy. Analogously, FIG. 10 is a simplification of the sensor device of FIG. 8 where the components in X direction and gradient dBx/dy are not obtained for each sensor. It is similar to the sensor device of FIG. 6 further capable of measuring magnetic field gradient signals dBy/dy and dBz/dy.

Functionally speaking, the sensor devices of FIG. 3, FIG. 5, FIG. 7, and FIG. 9 are analogous to the sensor devices of FIG. 4, FIG. 6, FIG. 8, and FIG. 10 respectively.

The multi-track concept has the drawback that there is considerable overlap (or crosstalk) between the magnetic field generated by the first and second tracks. The crosstalk is lower in the components parallel to the direction established between the magnetic structure and the sensors, or Z direction, however in the components of the field which are orthogonal to the Z direction, the crosstalk is usually much higher. In order to solve this, prior art tracks and sensor positions must be spaced sufficiently apart from each other to allow individual reading, so each sensor can obtain the signal from its respective track with low crosstalk. This may require the use of several sensor platforms or using large semiconductor chips, which is expensive. Alternatively, the crosstalk can be corrected by calculation.

The signal processing will be discussed in more depth in the examples below. In general terms, each sensor is adapted to measure field components having different directions, for example two orthogonal field components of the field in the proximity of the respective tracks. Thus, four signals are obtained from the field (two from each sensor position), but the readings from the sensor next to each track suffer from crosstalk from the other track. The mathematical correction requires solving a linear regression problem. This can provide two quadrature components for each track. From these, the master angle and nonius angle can be obtained, which are again combined to provide the uncalibrated absolute angle. A final calibration can be provided to eliminate nonlinearities such as mechanical misalignments or imperfections in the magnet.

However, this method entails complex data processing, since the master angle as well as the nonius angle can only be reconstructed by continuous linear combination of all four input signals. Additionally, the coefficients used for the master angle will be valid only for the exact calibration position. If a slight misalignment happens, an error will be introduced in the calibrated angle.

The present invention provides a system and sensor, and a method of position sensing, which reduces crosstalk between the field generated by the master track and the field generated by the nonius track. This is done with no need of separating the sensing elements, so the magnetic sensing system can fit in a reasonably small chip, reducing costs. This is provided by adapting the magnetic structure, where the master track generates a much stronger magnetic field than the nonius track, e.g., at least twice as strong. Hence, the first sensor detects the field generated by the stronger first magnetic track while the contribution to the magnetic field, detected by the first sensor, of the weaker second magnetic track can be neglected. In order to determine the fine angle, using four input signals is not required in the linear combination to obtain the fine angle once the position of the nonius is obtained, so the sensing is less sensitive to misalignments. Complex computation is not required during motion, it only may be required at 'start up' of the sensing system.

A magnetic structure where the master track generates a much stronger field than the nonius track can be realized in different ways. The poles in the master track may be physically larger. However, the present invention is not limited thereto, and the size of the master and nonius track may be similar (such as the structures shown in FIG. 2) however providing poles in the master track made from different magnetic materials than the poles in the nonius track (or both the size and materials of the poles may be different).

In a first aspect, the present invention provides a sensing system including a magnetic structure with a master track and nonius track, and respective sensors to measure the field proximal to each track. The magnetic structure is adapted so that the first sensor senses the magnetic field of mostly the master track, so that disregarding the field from the nonius track does not affect the accuracy of the measurement. The at least two sensors can be provided in the same sensor chip. The magnetic structure is not rotation-symmetric over 360 degrees (in other words, it has a 1-fold rotation symmetry, so the field is the same only after 360-degree rotation). For example, the master and nonius track have different number of poles such that there is 1-fold symmetry of the field, usually the master track having more poles than the nonius track, e.g., one pole more.

In some embodiments, each sensor is adapted to provide measurement of orthogonal components of the magnetic field as explained earlier. In some embodiments, the at least two sensors may be comprised in any of the magnetic sensor devices discussed with reference to FIG. 3 to FIG. 10. These figures show various examples of sensor devices which can be used in embodiments of the present invention, but the present invention is not limited thereto, and other sensor structures may also be used, for example sensor structures comprising magneto-resistive elements.

The predefined distance between sensors $\Delta x$ may be a value in the range from about 1.0 mm to about 3.0 mm, e.g., from about 1.5 mm to about 2.5 mm, e.g., equal to about 2.0 mm. The predefined distance between two pairs of sensors $\Delta y$ may be a value in the range from about 0.5 mm to about 3.0 mm. As mentioned above, $\Delta y$ (to be oriented in the circumferential direction of the magnetic source) may be larger or smaller than $\Delta x$ (to be oriented in the radial direction of the magnetic source).

The magnetic structure of the sensing system enables better and simpler approach, as the master track provides a stronger magnetic field, e.g., two or three times higher, or even 5 times, or 10 times higher than the nonius track. This allows less crosstalk at the first sensor (at the position P1 facing the master track).

The relative positioning of the first and second magnetic sensors may be optimized for reducing the crosstalk, with the constraints of a small distance between these magnetic sensors, e.g., both sensors being provided on the same sensor device, e.g., a chip. In general, the distance between the first sensor and the nonius track should be larger than the distance between the second sensor and the nonius track.

In some embodiments, the first sensor is additionally closer to the master track than to the nonius track. In some embodiments of the present invention, the top projection of first sensor overlaps the master track, and the second sensor is at least at the same distance from both, preferably closer to the nonius track than to the master track. The top projection of the second sensor may overlap the nonius track, alternatively it may overlap a gap of non-magnetic material between the master and nonius tracks. The present invention is not limited to these configurations, and the top projection of the second sensor may overlap the master track. In some embodiments, the top projection of the mid-point between the first sensor and second sensor does not overlap the nonius track.

A position sensor with such sensing system provides position sensing with less computational load during the measurement, as it will be seen below.

In some embodiments, each magnetic dipole of the master track provides a magnetic field where the measured components are at least twice higher than each of the magnetic dipole of the nonius track.

The magnetic field, for example the maximum value of the norm of the flux, may be compared for each track substantially at the same location relative to the other track, for example above the center of a magnetic pole and on the centerline of the track (where Bz is maximum) at a similar airgap, or between two opposite poles on the centerline of the track (where Bx is maximum) at a similar airgap. Alternatively, the maximum value of the norm of the flux at any location above each track at similar air gap can be also considered. The fact that the magnetic field is larger for the master track (at least twice larger) depends on the magnetic tracks themselves, due to the size of the poles, the magnetic materials of the poles, or both, rather than from placement of the sensors or the like. In some embodiments, the airgap may be at least 0.3 mm, up to 5 mm.

For example, the fields of each track could be compared at the opposite sensor location. The position P1 of the first sensor is farther to the nonius than the position P2 of the second sensor. The magnetic flux generated from the nonius track at the position P1 of the first sensor can be at least half to a tenth, for example at least half, or a third, or a fourth, or a fifth, or a sixth, or a tenth, of the value of the magnetic flux generated from the master track at the position P2 of the second sensor. In contrast, in the prior art these values are substantially equal. The effect is that the crosstalk is reduced at the first position P1, even if it may be increased at the second position P2. A surprising effect is that the overall determination of the absolute position is improved, rather than having the crosstalk changes cancel each other or even worsen the determination of the absolute position.

The present invention can be applied to a linear or to a rotatable system, with a suitable adaptation. In the following, details of the present invention will be explained with reference to a sensing system adapted to measure the angular position of a rotating system. For example, the master track and the nonius track are concentric tracks rotatable about a common rotation axis, so the position of the rotation system, e.g., the angular position of a rotating system such as a rotor, can be obtained.

In some embodiments, the master and nonius tracks are rectangular toroids.

In some embodiments, the master and nonius tracks are coplanar tracks, axially magnetized. The sensors can be placed above or below the tracks, in a plane parallel to the tracks, so the Z component of the field is the axial direction. For example, a sensor chip may include all the sensors, e.g., the sensors may be monolithically integrated with the chip parallel to the tracks. This way, rotating motion of the tracks relative to the sensors are detected as a changing magnetic field and orientation thereof.

In particular, the nonius track may be enclosed by the master track for practical reasons, as the nonius track is usually smaller (with lesser number of pole pairs) than the master track.

As explained earlier, the master track provides a much higher magnetic field than the nonius track, e.g., the maximum magnetic flux density which is 2 times larger, for example 3 or 6 times larger, for at least two components of the field, for example two orthogonal components of the field. In some embodiments, the master track is made of a magnetic material with a larger magnetization than the nonius track. Many combinations could be envisaged, for example neodymium-based magnets for the master track, with ferrite magnet in the nonius. In some embodiments, the two tracks may comprise neodymium-based alloys, with a different content of magnetic material. For example, the first track may comprise a high content or almost exclusive content of FeNdB, while the second track comprises FeNdB in a plastic matrix (also called plastic bonded magnet), so the content of magnetic material, and ultimately the strength of the second track, are lowered. The configuration of the magnetic structure may be as in the embodiments shown in FIG. 2, adapting the magnetic materials of the poles so the poles in the master track are much stronger (provide higher flux) than the poles of the nonius track.

Alternatively, or additionally, the relative size and geometry of the magnets may be adapted to obtain the desired effect. For example, the master track may comprise larger magnets than the nonius track in at least one dimension. For example, as shown in the embodiment of the present invention of FIG. 11, the tracks 101, 102 of the magnetic structure 100 may have the same thickness and be made of the same materials, which offers mechanical advantages in rotatable systems (e.g. uniform distribution when the magnetic structure is movable), but the first track or master track 101 has a width at least twice as large as the width of the coplanar nonius track 102, for example thrice as large, for example at least six times larger than the width of the coplanar nonius. The present invention is not limited thereto, and both the shape, size and materials of the poles in the master track may be different from the poles in the nonius track.

Figures 11, 12:
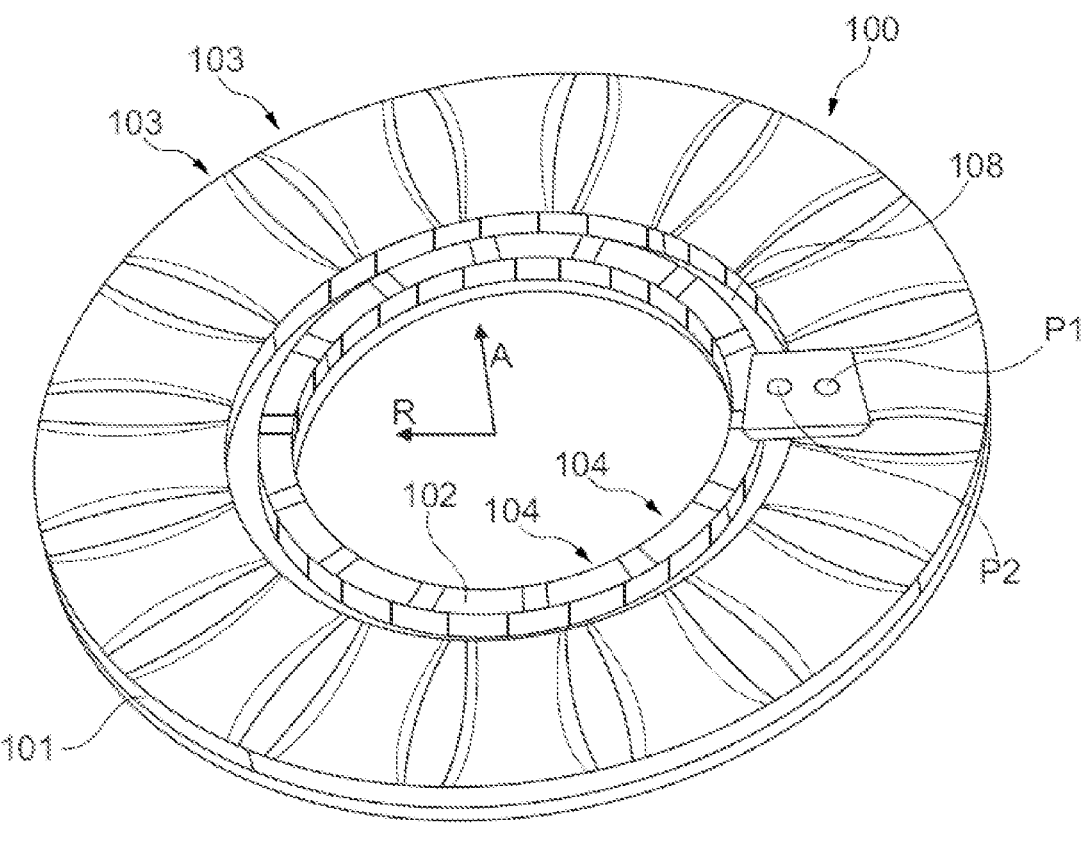
FIG. 11 illustrates a sensing system including a sensor device and a magnetic structure in accordance with embodiments of the present invention, for angular position sensing.
FIG. 12 illustrates a top view of the system of FIG. 11.

FIG. 11 shows a master track 101 with 8 pole pairs 103, where each black zone is a N or S pole. The nonius track 102 has 7 pole pairs 104, where the magnets are much smaller than the magnets of the master track. When the magnetic structure turns around its center in a plane perpendicular to the axis A, the sensors at the positions P1, P2 next to the master and nonius tracks obtain signals of the pole pairs 103 of the master track 101 and the signals of the pole pairs 104 of the nonius track 102, respectively. For example, the position P1 of the first sensor may overlap the first track. For example, the position P2 of the second sensor may not overlap the second track, for example it may cross the zone of adjacency between the first and second track, for example it may overlap the code-free region 108 as shown in FIG. 11. It may be at least at the same distance of both tracks, closer to the nonius track; the position P2 of the second sensor may overlap the nonius track. The position P2 may overlap the master track as well. This is not limited to the planar geometry of FIG. 11, but to any other magnetic structure geometries in accordance with embodiments of the present invention. It is noted that the overlapping direction follows the distance of the respective sensor to the magnetic structure. In case of FIG. 11, the overlapping is on the top view.

Since the magnets are much larger for the master track, the signal of the magnets (the pole pairs 104) in the nonius track can be disregarded. The flux density for the axial and tangential components, sensed by the sensors, may be twice larger for the master track than for the nonius track, for example the maximum flux density for said components, or the field of the master track at the position P2 of the second sensor compared to the field of the nonius track at the position P1 of the first sensor as explained earlier. This can be applied to other configurations of the magnetic tracks, and for different components of the field.

For example, the first track has an area five times larger than the second track, for example 20 times larger, for example 10 times larger. Generally, the first track may be for example between 5 times and 50 times larger, for example between 10 times and 30 times larger, than the second track. FIG. 12 is a top view of the magnetic structure of FIG. 11 with particular measurements. Other parameters, dimensions and geometries can be used, nonetheless. The sensor device 105 is shown, placed so as to obtain a large signal from the master track with the first sensor and a second sensor, placed at a position P2 such that its Z direction does not cross the master track.

The present invention provides a first track (master track) and second track (nonius track) producing a weaker magnetic field than the first track, for example with half width, or less, than the first track. A non-magnetic gap is present between the two tracks, so it is defined between the edge of the nonius track facing the master track and the edge of the master track facing the nonius track. For example, the gap is defined between the inner edge of the master track and the outer edge of the nonius track. The gap includes non-magnetic material, e.g. air. The gap may have a width between half and twice the width of the nonius track, for example the gap and the nonius track may have similar width.

Figure 17:
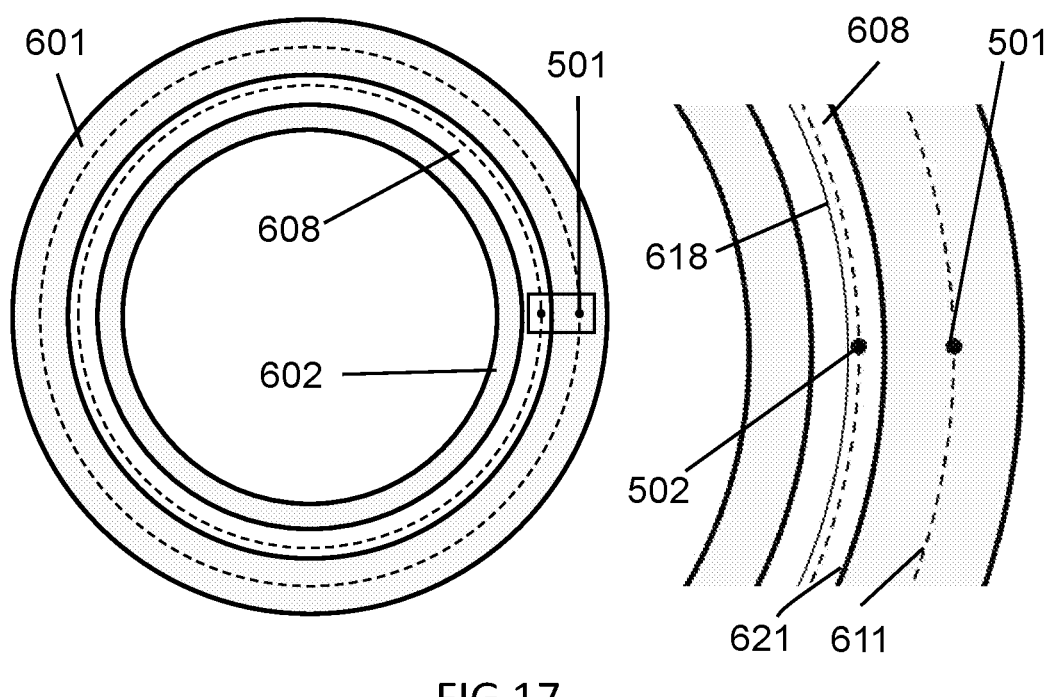
FIG. 17 shows a sensing system including a sensor device and a magnetic structure in accordance with embodiments of the present invention, for angular position sensing, indicating a possible positioning of the second sensor in accordance with embodiments of the present invention.
Figure 18:
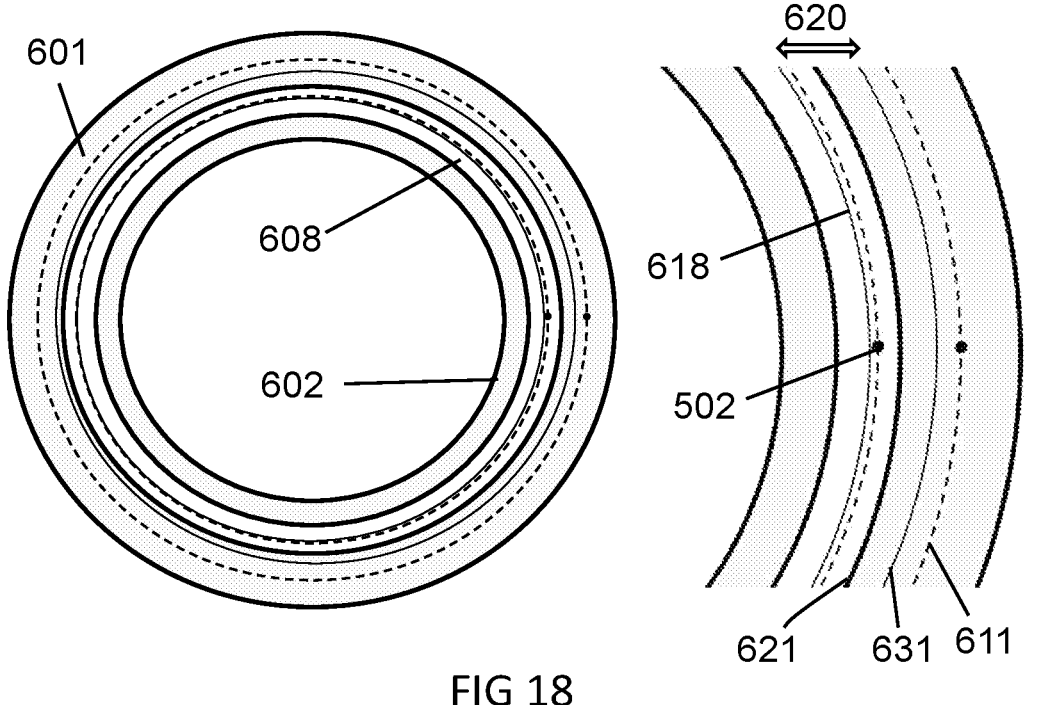
FIG. 18 shows a sensing system including a sensor device and a magnetic structure in accordance with embodiments of the present invention, for angular position sensing, indicating an alternative positioning of the second sensor in accordance with embodiments of the present invention.

FIG. 17 and FIG. 18 show two examples of the configuration. The position of the first sensor 501 overlaps the master track 601. In some embodiments, it may overlap the centerline 611 of the master track 601, see zoomed image at the right of FIG. 17. The distance between the first sensor 501 to the nonius track 602 is always larger than the distance between the second sensor 502 and the nonius track 602, in other words, the second sensor 502 is always closer to the nonius track 602 than the first sensor 501. However, in some embodiments, the second sensor may be closer to the master track than to the nonius track. FIG. 17 shows that the second sensor 502 overlaps the gap 608. For example, an area can be defined between the edge 621 of the master track and the centerline 618 of the gap, forming a first gap area, and between the edge of the nonius track and the centerline of the gap, forming a second gap area. The second sensor 502 may be placed overlapping the first gap area. In some embodiments, the second sensor may even be laid out at the edge of the master track, or even overlap the master track 601. This allows using a very compact sensing system which may include integrated circuits comprising sensors very close to each other, even fully integrating the first and second sensors in a single package or a single substrate. For example, with reference to FIG. 18, the second sensor 502 may be placed between the center line of the gap 618 and a line 631 at a distance of one third of the width of the master track 601, measured from the edge 621 between the gap 608 and the master track 601, in the region including half of the gap and one third of the master track indicated by the double-headed arrow 620.

Figure 13:
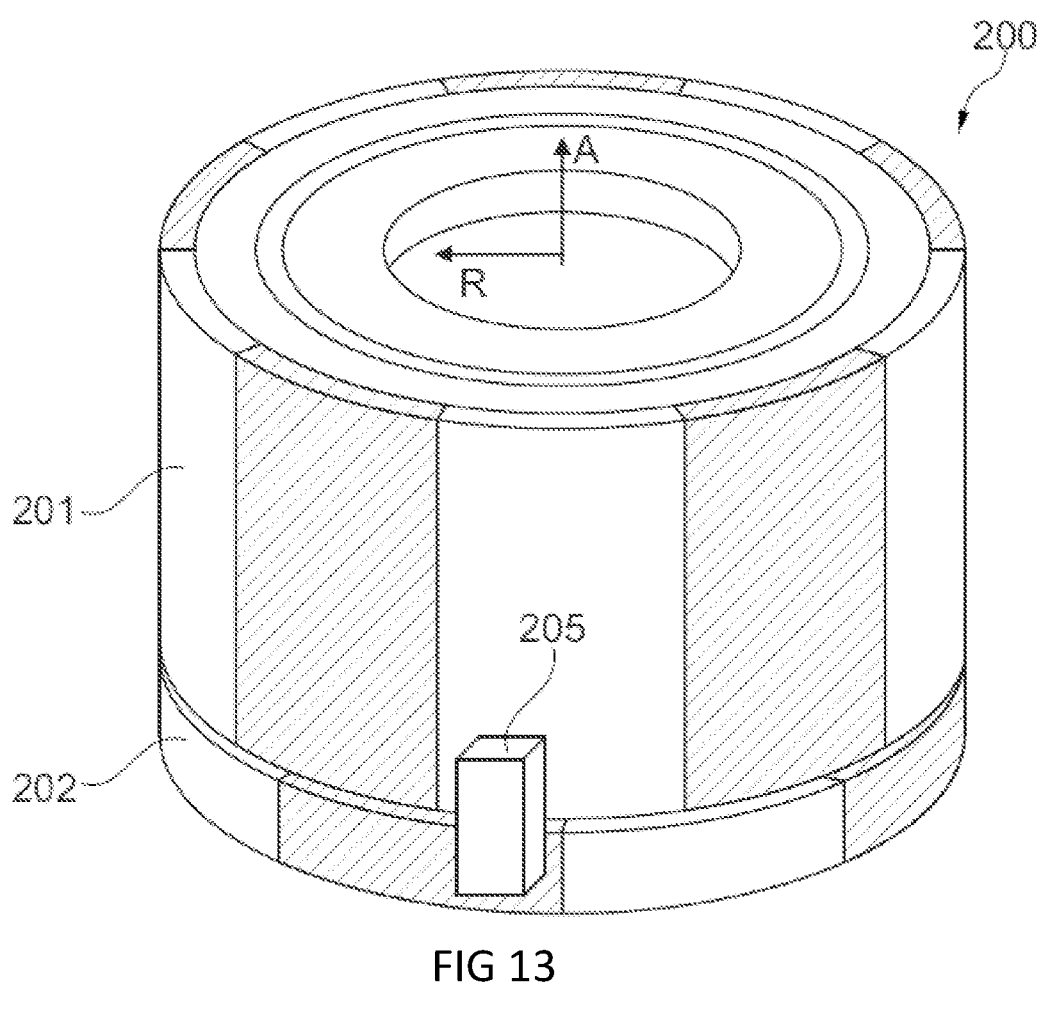
FIG. 13 illustrates an alternative sensing system including a sensor device and a magnetic structure in accordance with embodiments of the present invention, for angular position sensing.

The present invention is not limited to a coplanar setup. For example, a cylindrical setup could be used as shown in the embodiment of FIG. 13, where the tracks of the structure 200 are rings stacked in the axial direction (A). For example, the thickness (in the axial direction) of the master track 201 may be larger than the one of the nonius track 202. The dimensions can be adjusted to obtain the desired ratio of magnetic fields generated by the tracks, as mentioned earlier. For example, the magnetic materials of the master track may be stronger, with higher maximum flux density, than the magnets of the nonius, in particular for the relevant components relative to the sensors of the sensor device 205. The sensor device 205 is situated so it senses the perimeter of the tracks, with the first sensor close to the master track 201 and the second sensor away from the master track 201, proximal to the nonius track 202. As with FIG. 11, the first sensor may overlap the master track (on the side view in case of FIG. 13, following the distance between the sensor device 205 and the magnetic structure 200, which in this case is radial) and the second sensor may be on a code free region, or at the same distance of both of the tracks, preferably closer to the nonius track, e.g., overlapping the nonius track). This positioning of the sensor device, on a side of the sensing system, may be desirable under some spatial constraints.

Figure 14:
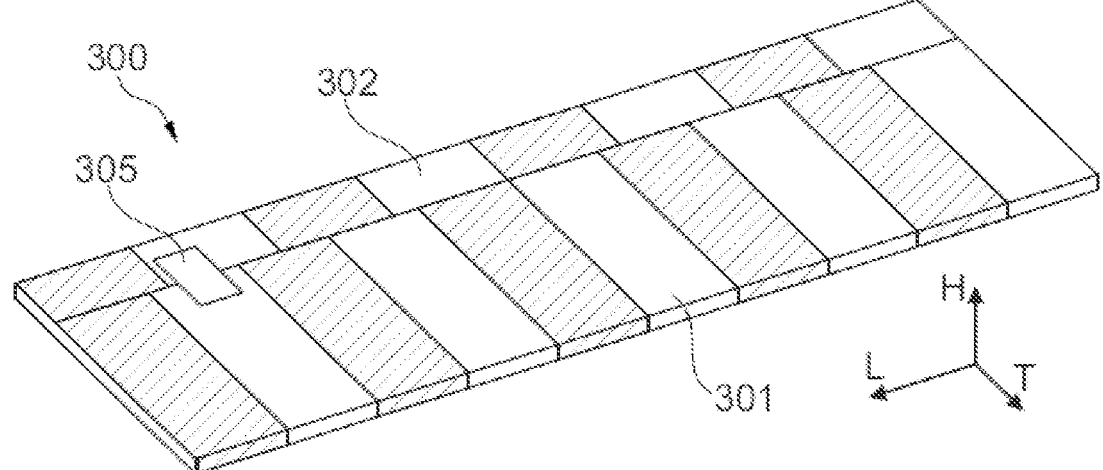
FIG. 14 illustrates an alternative sensing system including a sensor device and a magnetic structure in accordance with embodiments of the present invention, for linear position sensing.

FIG. 14 also shows an exemplary embodiment for a linear sensing system, for linear position measurement, where the magnetic structure 300 comprises parallel first and second linear tracks 301, 302, with a dipole distribution and sensor device 305 placed as defined with reference to the lowest drawing of FIG. 2.

In these figures, the width of the tracks of the compound magnetic structure is defined in the radial direction R in coplanar tracks, in the axial direction A in stacked cylindrical tracks, and in the transverse direction T in linear tracks.

In order for the master track and nonius track to show the required magnetic fields and ratio thereof, in the embodiment of FIG. 11, FIG. 13, and FIG. 14, the width of the master track is at least twice, e.g., at least thrice, e.g., six times larger than the width of the nonius track. However, the present invention is not limited to this, as explained earlier, and the magnetic material of the master track may be adapted, or other geometries can be provided (e.g., different thickness) to provide the desired configuration of the magnetic field.

In all these examples, the relative position between the first sensor and the magnetic structure is measured. For example, the moving target whose position is to be measured moves in solidarity with the first and second tracks, e.g. the moving target may be attached to the tracks, which are fixed to each other and/or the moving target, and the magnetic sensing system is fixed, analogously to the system in FIG. 1 (substituting the magnetic structure 12 and sensor device or chip 11 by a sensing system in accordance with embodiments of the present invention). Alternatively, the magnetic structure is static, and the magnetic sensing system moves in solidarity with, e.g., attached to, the target. For example, it may be a chip attached to the target. In any case, the master and nonius track do not move relative to the other. In embodiments of the present invention, the magnetic structure is a magnetic piece where the tracks are fixed to each other. In some embodiments of the present invention, the structure includes a gap between the first and second tracks. The gap may be filled with non-magnetic material. The presence of the gap reduces crosstalk between the magnetic structures.

The airgap can be defined as the shortest distance between the sensor and the tracks, e.g., the plane containing the track surface. This plane can be tangential to the curved surface of cylindrical setup of FIG. 13, or the plane of the tracks facing the sensors, in case of planar tracks of FIG. 11 and FIG. 14. The system is arranged so the sensors are coplanar and parallel to the plane containing the track surface, so the airgap for every sensor may be substantially the same. The airgap may be in the order of about 0.3 mm to about 5.0 mm, for example between 0.8 mm to 3 mm.

In a further aspect, the present invention provides a position sensor including a position sensing element in accordance with embodiments of the first aspect of the present invention. The position sensor further comprises processing means, such as a processing unit or processor, which may be coupled to the sensing system. For example, the processor may be an external module connectable or connected to signal outputs of the magnetic sensors. The processor can be included as an integral part with the magnetic sensors, e.g., the magnetic sensors and the processor can be monolithically integrated in the same chip or the like. However, this is not needed, and the processing can be done by an external processor, microprocessor or microcontroller, outside the sensor device, e.g., physically outside the sensing system.

FIG. 12 shows such position sensor 400 in accordance with embodiments of the present invention, including the sensing structure and the processing means 106 adapted to process the signals from the sensor device 105 (e.g., the sensor chip). Such processing means may be for example a processor, e.g., a microelectronic processor connected to the sensors of the sensor device 105, which may include calculation capabilities, programmability, memory (e.g., for a look-up table), etc. The processing means 106 may be a separate module, or it may be integrated monolithically with the sensor device 105.

In some embodiments of the present invention, the processing unit may comprise connections for an output unit 107, e.g., a memory, a display, interface, etc. For example, the output unit 107 may comprise a controller, coupled or connected to the processing means 106, so the controller may receive the signals from the processor and control a device accordingly, for instance it may control the powering of a motor moving the target to which the magnetic structure 100 is attached, in accordance with the feedback of the position sensor installed in said motor. The present invention, however, is applicable to other functionalities and devices.

In some embodiments of the present invention, the processing means 106 (e.g., a processing unit) may also include an internal memory and/or connections to retrieve information from a table, e.g., a LUT, for example for calibrating the position sensor.

In some embodiments, the processing unit (e.g., processor) may be adapted to perform a calculation using the measurements of the first and second sensors at startup of the sensing system, for example when the sensors of the sensing system are powered up. This results in a first absolute position. After startup of the sensor, the processor may be adapted to subsequently process the signals from the first sensor, disregarding the signals from the second sensor. The obtained processed signal is used to update the position information obtained at startup, thus providing the subsequent absolute position. The processor may be adapted to repeat this process cyclically, processing the signals from the first sensor only (thus, disregarding signals from the second sensor from the nonius track), and updating the information of the previously obtained absolute position, thus updating the absolute position with each cyclic measurement. The complex calculation using inputs of both sensors needs to be done advantageously only once, at startup (or activation) of the position sensor.

The processor includes contacts or inputs to receive signals from the first and second sensors, and process said signals to provide a position sensor. Signal processing may be done in accordance with a method discussed in the following.

In a further aspect, a method is provided for position measurement. Measuring the motion of a target includes linking the motion to be measured to a relative motion of a magnetic structure, including a first and second multipole magnetic tracks, relative to a first and second sensors, as explained earlier. The method may comprise providing a master track where the magnetic field flux is at least twice the flux of the one generated by the nonius. The method comprises reading the magnetic field in a first position adjacent to the first track (or master track) using a first sensor thereby obtaining a first signal. For example, the first sensor may be placed closer to the master track than to the nonius track. The method comprises reading the magnetic field in a second position, the second position not overlapping the master track, for example the second position being adjacent to the second track (or nonius track) using a second sensor thereby obtaining a second signal. The second sensor may be placed closer to the nonius track than to the master track. The method may be carried out with any of the embodiments of the sensing system, specially including the embodiments explained with reference to FIG. 17 and FIG. 18.

The method may comprise using a magnetic sensor device, e.g., a sensor chip including the first and second sensors. The method comprises using a first and second tracks which have different number of poles and move together in solidarity (both have the same speed and motion direction). In some embodiments, the method may comprise using a sensing system in accordance with the first aspect of the present invention, and processing the sensor signals with a processor. The method steps including signal treatment may be implemented algorithmically in the processor.

The method comprises using the signals from the first and second sensors to obtain quadrant information, or in other words, information related to which division of the target (e.g., which division in the 360°, for example which one of the eight 45° quadrant, for an eight-dipole multipole) is facing the sensor. This provides coarse information regarding the general position of the magnetic structure. The method comprises using the signals of only the first sensor to obtain the accurate position (e.g., angle) over the quadrant. Combining the coarse information and the accurate position information, it is possible to retrieve the absolute position (e.g., absolute angle) of the magnetic structure accurately.

Figure 15:
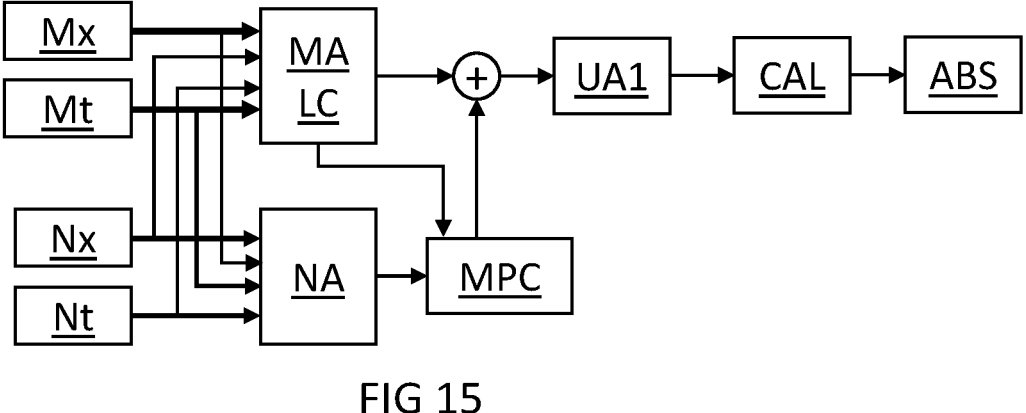
FIG. 15 shows a schematic existing method of signal treatment for obtaining absolute position of a target, using a prior art position sensing system as in FIG. 1 or FIG. 2.

FIG. 15 is a scheme of processing of signals, including a master and nonius tracks. The magnetic component in the direction between the magnetic structure and the sensor, and an orthogonal component, are measured at the sensor position. In this particular embodiment, it can be assumed that a coplanar magnetic structure is used, so the axial component Mx and tangential component Mt are sensed. The axial and tangential signals are provided by at least two sensing elements adapted to sense respectively the axial and the tangential components of the field.

The second sensor provides analogous measurements (signals) at the position adjacent to the nonius track, closer to the nonius track than to the master track. An analogous discussion for the second sensor can be done for the axial and tangential signals Nx, Nt as before.

In a first instance, crosstalk between the magnetic field generated by the master track and the field by the nonius track at the positions of either sensor can be taken into account, since the sensors are situated very close to each other, e.g., on one chip, for example integrated in a single chip. As explained before, separating the sensors is possible, which may bring new issues. It is economically advantageous if they are on a single chip, e.g., semiconductor chip.

The quadrature components can be obtained from the measurements as linear combinations of the different measured components (e.g., axial and tangential components).

In embodiments of the present invention, the quadrature between the signals stems from the sensitive elements being spaced at a particular distance, rather than from orthogonal components or gradients. In some embodiments, the sensitive elements may be matched to half the respective pole distance. For example, if using two Bz sensing elements spaced apart by half a pole distance on the master track and another two also spaced by half a pole distance on the nonius track (four Bz sensing element), the signals in each pair will be in quadrature, even though a single component is sensed (being sensed at two locations instead of one location).

The master axial signal Mx and master tangential signal Mt can be written as the field components Ba_master, Bt_master respectively, and the same can be done for the nonius signals Nx, Nt as Ba_nonius, Bt_nonius.

$$Sin(Npp^*x)=A1^*Bt\_master+A2^*Ba\_master+ \\ A3^*Bt\_nonius+A4^*Ba\_nonius \qquad\qquad 1)$$

$$Cos(Npp^*x)=A5^*Bt\_master+A6^*Ba\_master+ \\ A7^*Bt\_nonius+A8^*Ba\_nonius \qquad\qquad 2)$$

$$Sin((Npp-1)^*x)=A9^*Bt\_master+A10^*Ba\_master+ \\ A11^*Bt\_nonius+A12^*Ba\_nonius \qquad\qquad 3)$$

$$Cos((Npp-1)^*x)=A13^*Bt\_master+A14^*Ba\_master+ \\ A15^*Bt\_nonius+A16^*Ba\_nonius \qquad\qquad 4)$$

The master track has a predetermined number Npp of poles, and the nonius track has one pole less (Npp-1 poles) than the master track. The two first combinations 1), 2) are the quadrature components (Sin and Cos) of the master track, and the components include the crosstalk components of the second sensor (corresponding to the nonius track). The other two combinations 3), 4) are the components of the nonius track, including components also of the measurement from the first sensor, due to the aforementioned crosstalk.

Hence, the master track angle MALC is obtained, from linear combination LC of all four signals, as the components 1), 2). The nonius angle NA is obtained as components 3), 4) also from linear combination of all four signals. The master pole counter MPC is obtained by combining the master angle MA with the nonius angle NA. It gives information related to the sector of the structure from which the sensors are receiving the magnetic field. Combining again the MPC with the MALC delivers the (uncalibrated) absolute position UAL for example in this case the angle within a range between 0° and 360°. A final calibration CAL (e.g., using a look up table LUT) may be applied to compensate for mechanical or magnetic irregularities thus obtaining the absolute angle ABS. The linear regression operations and further calculations need to be done for each sequential measurement obtained by the sensors, e.g., periodically every few fractions of a second. This is a computationally intensive operation which slows down the position detection. However, the calibration and regression may be done only once, and then the measurements provided by the first sensor can be simply used to update the position information. In other words, since initially the nonius position is used to obtain the quadrant, it is possible to update the information of the quadrant after the relative motion indicates the passing from one quadrant to another, which can be tracked by the measurements on the first track.

In embodiments of the present invention, the magnetic configuration of the master track relative to the nonius track results in signals from the first sensor with much lower crosstalk from the magnetic field of the nonius. This allows to disregard the measurement of the second sensor. This simplification is enabled by the present invention, and it can be carried out in different ways, by signal treatment.

Figure 16:
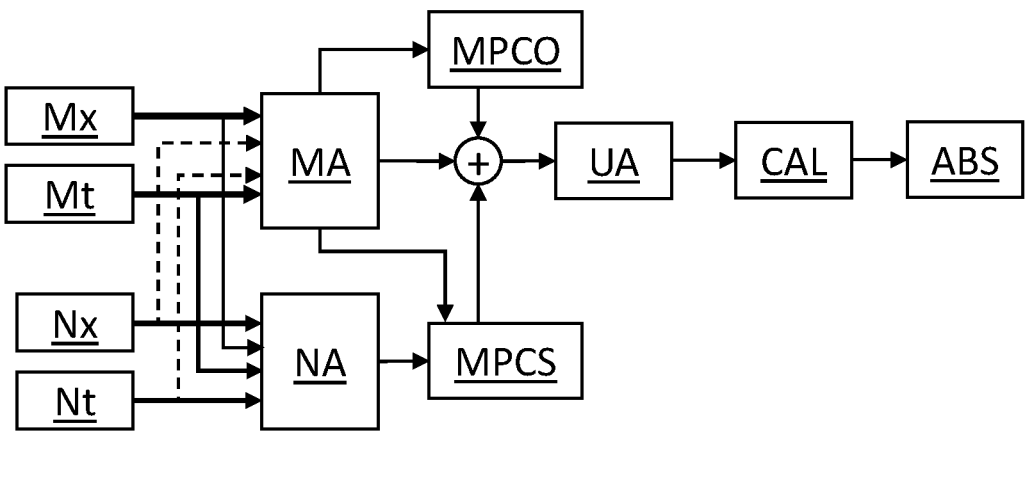
FIG. 16 shows a schematic method in accordance with embodiments of the present invention for obtaining absolute position of a target, using a sensing system in accordance with embodiments of the present invention.

In some embodiments, the linear regression is done as previously shown for obtaining the absolute angle. However, the present invention allows disregarding the signals from the second sensor (the nonius signals) in this calculation. For example, FIG. 16 is a scheme of a method in accordance with an embodiment of the present invention. As before, the first sensor provides two orthogonal signals, Mx, Mt corresponding to a field in the position closer to the master track than to the nonius track. The second sensor provides two orthogonal signals, Nx, Nt which may correspond to the same orientation as the ones of the first sensor. These are generated by the field in the position closer to the nonius track than to the master track.

Then, as before, a linear regression is obtained from these signals, forming the system of four equations as shown earlier.

However, in embodiments of the present invention, the calculation of the first two equations 1), 2) for the master track does not require using the measurement from the second sensor. This is indicated by the hatched arrows in FIG. 16. In the particular algorithm with the equations 1), 2), 3), 4) shown earlier, the coefficients A3, A4, A7, A8 are set as 0.

In other words, using the structure as in embodiments of the present invention allows the following simplification:

$$Sin(Npp*x)=A1*Bt\_master+A2*Ba\_master \qquad 1)$$

$$Cos(Npp*x)=A5*Bt\_master+A6*Ba\_master \qquad 2)$$

$$Sin((Npp-1)*x)=A9*Bt\_master+A10*Ba\_master+$$
$$A11*Bt\_nonius+A12*Ba\_nonius \qquad 3)$$

$$Cos((Npp-1)*x)=A13*Bt\_master+A14*Ba\_master+$$
$$A15*Bt\_nonius+A16*Ba\_nonius \qquad 4)$$

It is noted, however, that the linear regression of the second sensor may still be heavily influenced by the crosstalk of the much stronger master track, so the signals from the first sensor may be taken into account in the calculation (equations 3) and 4)).

The master and nonius angles are obtained from the Sin and Cos, by calculating the respective modified Arctan function.

After the linear regression is solved to obtain the master angle MA and nonius angle NA, the master pole counter MPC and the uncalibrated angle UA can be obtained:

$$MPC=int(MA-NA-MA/Npp)$$

$$UA=MPC*360/Npp+MA/Npp$$

A final calibration CAL can be provided, e.g., by calculation, or using a LUT, to eliminate nonlinearities such as mechanical misalignments or imperfections in the magnet, thus providing the calibrated absolute angle ABS. The number of points used in the LUT is equal to 16*Npp as a useful trade-off between resolution and number of calibration points. However, other number of points can be used, e.g., between 4*Npp and 32*Npp. These equations can be solved periodically.

These particular equations and algorithms exemplify an effect of the present invention on signal treatment; however, the present invention is not limited to these specific algorithms or specific orthogonal components of the field to provide the measurement of position.

For example, instead of the axial and transversal components, different components can be used, such as radial and transversal components. This may be the case, for example, if stacked tracks are used such as the one shown in FIG. 13. The components may also be components in the height H and linear L direction, for the linear embodiment of the sensing system as shown in FIG. 14. In this case, different algorithms may be used, but still the reading of the second sensor can be used only when measuring the position of the particular dipole in the track (master pole counter), and it can be disregarded when measuring the position relative to the particular dipole (absolute position).

In some embodiments, the master pole counter is obtained from the first sensor and the second sensor at start up of the sensing system (master pole counter at start, MPCS). This can be done, for example, by following the simplified linear regression calculation as shown earlier. Once this has been done at start up, subsequent measurements only require signals from the first sensor. Because the initial measurement allows determining the sector (discriminating the pole) from which the field is being sensed by the first sensor, and since the influence of the nonius track is negligible, further accurate measurements from the first sensor can be used to simply update the master pole counter in operation (MPCO), with no need to calculate the MPC again from the linear regression. As shown in FIG. 16, for updating the MPCO there is no need to use signals from the second sensor, until possibly next startup, or possibly to readjust the MPC after several turns for example, to determine again or verify the position of the magnetic structure sector affecting the sensors.

In some embodiments, the startup of the sensing system is performed while the target moves. For example, a device such as a motor (including the sensor of the present invention) may be rotating, and the method may be executed by obtaining the master and nonius angle at startup (when turning the sensors on) while the motor is running. In some embodiments the measurement of the absolute position, including taking into account the signals from the second sensor, may be performed before the normal motion of the device starts, before starting the motion of e.g., an engine.

The present invention provides a precise measurement from the master track, which defines the overall measurement accuracy. The measurement from the nonius channel does not need to be as precise, as it is only used to discriminate the absolute position. The measurement at the second position (with the second sensor for the nonius track) can accommodate some crosstalk from the master.

The invention claimed is:

1. A sensing system for sensing position, including:
a first magnetic track comprising a first number of multipoles for generating a magnetic field and a first sensor for sensing magnetic field,
a second magnetic track for generating a magnetic field and a second sensor for sensing magnetic field,
the first and second magnetic tracks being concentric and solidarily fixed to each other forming a magnetic structure being rotatable about a common rotation axis,
wherein the first track has a first predetermined width, and the second track has a second predetermined width, the first predetermined width being at least two times larger than the second predetermined width,
wherein the first magnetic track is separated from the second magnetic track by a non-magnetic gap,
wherein the first sensor is positioned overlapping the first magnetic track, and the second sensor is positioned between a centerline of the non-magnetic gap and one third of the width of the first magnetic track,
wherein the second sensor is closer to the second track than the first sensor,
wherein the first and second sensors are integrated in a single package or a single substrate.

2. The sensing system of claim 1, wherein the first sensor is substantially positioned close or at the centerline of the first track.

3. The sensing system of claim 1, wherein the non-magnetic gap is divided in two gap areas being a first gap area and a second gap area, wherein the first gap area is defined between the first track and the centerline of the non-magnetic gap, and a second gap area is defined between the centerline of the non-magnetic gap and the second track, and wherein the second sensor overlaps the first gap area.

4. The sensing system of claim 1, wherein the second track is enclosed by the first track.

5. The sensing system of claim 1, wherein the tracks have the same thickness and are made of the same magnetic material.

6. The sensing system of claim 1, wherein the first track is a multipole with at least 8 dipoles and the second track comprises a non-zero number of dipoles, the number being different than the number of dipoles of the first track.

7. The sensing system of claim 1, wherein the first and second sensors are adapted for sensing at least two orthogonal field components.

8. The sensing system of claim 1, wherein the first and second sensors are integrated in a single semiconductor chip.

9. The sensing system of claim 1, further including a signal processing means for processing the signals of the sensors and further including a signal output for providing the absolute position of the first track relative to the sensor.

10. The sensing system of claim 9, wherein the processing means is adapted to calculate the initial position from the measurement of the second sensor at startup of the sensing system.

11. The sensing system of claim 9, wherein the processing means is adapted to obtain the position with the measurement signals from the first and second sensors, and to calibrate the position.

12. A method of sensing a position using the sensing system of claim 1, further comprising retrieving the measurement of the first and second sensors and calculating the position of the magnetic structure relative to the first sensor.

13. The method of claim 12, further comprising subsequently calibrating the result for compensation of mechanical misalignments.

14. The method of claim 12, further comprising detecting the position of the first track by using the measurement of the first sensor and second sensor for detecting the dipole of the magnetic structure over which the sensors are, while ignoring the measurement of the second sensor for detecting the absolute position of the first sensor with respect to the magnetic structure.

15. The method of claim 14, wherein detecting the position of the dipole and the absolute position is performed at startup of the sensor, further comprising ignoring the signals of the second sensor in subsequent measurements after the initial position of the first track is detected, by using the measurement of the first sensor for retrieving the dipole of the magnetic structure over which the sensors are.

16. The method of claim 12, further comprising detecting the position of the first track by using the measurement of the first sensor and second sensor for detecting the dipole of the magnetic structure over which the sensors are, and for detecting the absolute position of the first sensor with respect to the magnetic structure, by performing linear combination of the measurements of the first and second sensor.

17. The sensing system of claim 1, wherein a magnetic flux generated by the second track at a first position corresponding to the first sensor is half to a tenth of a magnetic flux generated by the first track at a second position corresponding to the second sensor.

* * * * *